United States Patent [19]

Cleary

[11] 3,922,250

[45] Nov. 25, 1975

[54] LATE ADDITION OF ALKALI METAL SULFONATE DYE RECEPTIVITY ADDITIVE IN POLYESTERIFICATION PROCESS

[75] Inventor: James W. Cleary, Bartlesville, Okla.

[73] Assignee: Phillips Petroleum Company, Bartlesville, Okla.

[22] Filed: Sept. 3, 1974

[21] Appl. No.: 502,808

[52] U.S. Cl. .................................. 260/49; 260/75 S
[51] Int. Cl.² .......................................... C08G 63/68
[58] Field of Search ............................ 260/49, 75 S

[56] References Cited
UNITED STATES PATENTS

| | | | |
|---|---|---|---|
| 3,018,272 | 1/1962 | Griffing | 260/75 |
| 3,033,824 | 5/1962 | Huffman | 260/75 |
| 3,528,947 | 9/1970 | Lappin et al. | 260/75 |
| 3,634,541 | 1/1972 | Popp et al. | 260/75 |
| 3,663,508 | 5/1972 | Mobius et al. | 260/49 |

Primary Examiner—Lester L. Lee

[57] ABSTRACT

In a polyesterification process, a suitable ester-forming sulfonate dyeability modifier is introduced into the reaction zone after the initial esterification or transesterification reaction is essentially complete.

12 Claims, No Drawings

LATE ADDITION OF ALKALI METAL SULFONATE DYE RECEPTIVITY ADDITIVE IN POLYESTERIFICATION PROCESS

BACKGROUND OF THE INVENTION

This invention relates to the use of alkali metal sulfonates to improve the dyeability of polyesters.

Synthetic fibers and films from polyester resins have found a very wide utility in recent years. In the continuing improvements of such materials, there is a need for improving the dyeability of polyesters to enhance their value in the form of filaments, fibers, and fabrics prepared therefrom. Without some modification, polyesters are generally dyeable only with disperse dye systems. The incorporation of some form of a dye-acceptor into the polyester can provide a means by which the polyester is made basic-dyeable or acid-dyeable. If, for example, a basic dyeability modifier is successfully incorporated into a polyester resin, this would permit two-color dyings of the polyester fibers or fabrics from a single dye bath which contains both a disperse dye and a basic dye.

However, the incorporation of a dyeability modifier to provide this improved dyeability function runs the risk of disturbing other important physical or chemical properties of the polyester resin. Thus, such a modified polyester composition may have been rendered more dyeable but also simultaneously rendered less suitable for fiber-formation. Indeed, the corporation of some dye-acceptors has caused a deterioration of some polyester resin properties such as resin color, molecular weight, melting point, glycol ether content, and the like. This has caused poor melt-spinning performance and/or poor fiber qualities.

For example, a class of dyeability modifiers typified by the compound dimethyl sodium sulfoisophthalate is such a material in point. This compound, when incorporated into the polyester resin, dramatically improves the dyeability of formed products of the polyester with basic dyes but substantially reduces the suitability of the polyester resin for melt-spinning into fibers.

SUMMARY OF THE INVENTION

It is an object of this invention to overcome deleterious effects of sulfonate dyeability modifiers while still retaining the dyeability-improving advantages thereof;

It is a further object of this invention to provide a polyester having enhanced dye receptivity and good color;

It is yet a further object of this invention to provide a polyester having enhanced dye receptivity and relatively high inherent viscosity; and It is still yet a further object of this invention to provide a polyester fiber material having a good balance of properties.

In accordance with this invention a sulfonate dyeability modifier is added to a polyesterification process after the initial esterification or transesterification is essentially complete.

DESCRIPTION OF THE PREFERRED EMBODIMENTS

In one embodiment of the present invention, there is provided a process for preparing basic dyeable polyester resins which comprises incorporating into said polyester resin at least one organic ester-forming sulfonate compound of the class represented by the formulas (A) or (B) below:

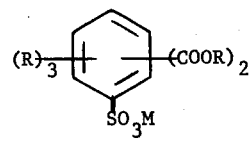

Formula (A)

or

Formula (B)

wherein each R is selected from hydrogen or alkyl radicals having from one to five carbon atoms and M is an alkali metal, and wherein the organic sulfonate compound is introduced into the reaction zone only after the initial esterification and/or transesterification is essentially complete, and wherein at least the final polycondensation reaction is preferably carried out in the presence of a minor amount of an alkali metal hydroxide.

In still another embodiment of the present invention there is provided a process for the preparation of dyeable polyester resins which comprises incorporating into said polyester resin a mixture of organic ester-forming sulfonates containing at least one compound corresponding to Formula (A) above and at least one compound from the class represented by Formula C below:

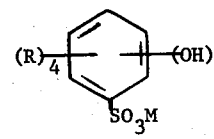

Formula (C)

wherein R and M are as previously described, and wherein the mixture of sulfonates is introduced into the reaction zone only after the initial esterification and/or transesterification is essentially complete, and wherein at least the final polycondensation is carried out in the presence of a minor amount of an alkali metal hydroxide. It is presently believed that such a combination of sulfonate dyeability modifiers is particularly effective. It is postulated that the ester-forming sulfonate modifiers of Formula (C) are effective in providing dye sites on polymer chain end groups, while the polyester-forming modifiers of Formula (A) provide dye sites within the chain.

Some examples of ester-forming organic sulfonates of Formula (A) are:
  dimethyl sodium 5-sulfoisophthalate (DMSI),
  dimethyl potassium 5-sulfoisophthalate,
  di-n-pentyl lithium 3-sulfoterephthalate,
  dimethyl sodium 2,6-dimethyl-5-sulfoisophthalate,
  potassium 5-sulfoisophthalic acid, and the like, and
    mixtures thereof.

Some examples of the organic sulfonates of Formula B are:

monosodium 5-sulfosalicylic acid (SSA),
monopotassium 5-sulfosalicylic acid,
methyl lithium 5-sulfosalicylate,
n-propyl sodium 3-hydroxy-4-sulfobenzoate,
monopotassium 2,5-dimethyl-4-hydroxy-3-sulfobenzoic acid, and the like, and mixtures thereof.

Some examples of the organic sulfonates of Formula C are:

sodium p-phenolsulfonate (PhS),
potassium p-phenolsulfonate,
lithium p-phenolsulfonate,
sodium 3,5-diethyl-4-hydroxybenzenesulfonate,
sodium 2,3,5,6-tetramethyl-4-hydroxybenzenesulfonate, and the like, and mixtures thereof.

Generally speaking, the sodium, potassium, and lithium salts of the organic sulfonates are presently preferred with sodium being the most preferred because of cost and availability. With the sulfophthalates of Formula (A), it is presently preferred that these compounds be in the form of alkyl esters, preferably methyl esters, because of greater ease and effectiveness.

The amounts in which the organic sulfonate dyeability modifiers are employed in preparing the dyeable polyester resins can be any effective dye receptivity improving amount and are generally in the range of from about 0.1 to about 6 mole per cent preferably from 1 to about 4 mole per cent, based upon the total amount of moles of dicarboxylic acid comonomer or its ester forming derivative and the ester-forming sulfonate dyeability modifier. In the case of a mixture of compounds of Formula (A) and (B) or a mixture of Formula (A) and (C) the concentration of 0.1 to 6, preferably 1 to 4 mole per cent applies to the total mixture.

The benefits of the invention have been demonstrated in a polyesterification reaction employing dimethylterephthalate as the dicarboxylic ester comonomer and ethylene glycol as the diol comonomer. However, those skilled in the polyester art will recognize that other related dicarboxylate comonomers and diol comonomers can also be used. Generally speaking, with respect to the dicarboxylate comonomers, any polyester-forming dicarboxylic acid and/or its ester-forming derivative such as a dimethylester of a dicarboxylic acid, is suitable. Esters of dicarboxylic acids are by far preferred and aromatic dicarboxylate ester comonomers such as dimethyl terephthalate are particularly suitable.

With respect to applicable diols, the invention process can utilize, in general, any polyester-forming diol with aliphatic glycols being preferred, particularly glycols containing from two to about 10 carbon atoms per molecule. Ethylene glycol is particularly effective. Suitable monomers or comonomers for polyesterification reactions are well known in the polyester art and need not be further defined.

The applicable alkali metal hydroxides suitable for use in the present invention are selected from the hydroxides of lithium, sodium, potassium, rubidium, and cesium, or mixtures thereof. Because of its ready availability and economy, sodium hydroxide is presently preferred.

The amount of alkali metal hydroxide utilized in the present process will depend upon the amount of the organic sulfonate dyeability modifier present in the polyesterification zone and can be any effective viscosity-modifying amount. Generally speaking, at least some of the improvements of the present invention can be obtained by using alkali metal hydroxides in amounts ranging from 1 to about 50 equivalent per cent of the sulfonates present. That is, 1–50 mole equivalents of hydroxide per 100 mole equivalents of the ester-forming sulfonates.

Optimum amounts of the metal hydroxide will depend upon the specific polyesterification system including the specific sulfonate modifier used and the minimum acceptable properties of the polyester, and this optimum amount can be determined by simple experimentation. When utilizing the sulfonate compounds of formula (A), effective results are obtained if the amount of alkali metal hydroxide used is in the broad range of 3–20 equivalent per cent of the sulfonate compound. On the other hand, optimum results are obtained with the sulfonates of formula (B) when the amount of alkali metal hydroxide present is in the range of 20–40 equivalent per cent.

The polyesterification procedure which is applicable for use in the present invention is that procedure which is well known in the polyester resin art. Generally speaking, a free dicarboxylic acid and a glycol, for example, are heated together at temperatures up to about 300° C, under conditions such that evolved by-product water and excess glycol are removed, until the polyesterification is essentially complete. Preferably, an ester of a dicarboxylic acid compound is employed as a comonomer and the reaction mixture is heated at a temperature of about 150° C to about 270° C to affect an initial transesterification reaction. For example, if dimethyl terephthalate is used, methyl alcohol is evolved during this transesterification period. The reaction mixture is then further heated to complete the polycondensation and to distill excess glycol from the reaction mixture. Temperatures during this period can range from about 200° C to about 325° C. The initial molar ratio of diol to dicarboxylate is generally in the range of 1.3:1 to 7:1, preferably 2:1 to 4:1.

The final polycondensation stage is preferably carried out under a reduced pressure to further promote the evolution of volatile materials. If desired, however, the entire polyesterification reaction, including the final polycondensation stage, can be carried out at atmospheric pressure while bubbling a stream of inert gas through reaction mixture. The total reaction period can be from about 1 to about 12 hours, depending upon the catalyst employed, the temperature, the pressure, the starting comonomers, the desired viscosity for the polyester product, etc., as is well known in the art. The polyesterification can be carried out either batch wise or continuously.

The polyesterification is generally carried out in the presence of one or more suitable catalysts in order to shorten the total reaction period. Any of the well known polyesterification catalysts can be used such as antimony oxide, zinc acetate, maganese acetate, cobaltous acetate, and the like. Some of these catalysts, such as zinc acetate, are particularly effective in promoting the transesterification stage of the reaction when the carboxylate esters are employed as comonomers. Other catalysts such as antimony oxide are particularly effective in promoting the polycondensation stage of the reaction which produces the high molecular weight polyester. Consequently, more than one catalyst can be utilized in the reaction zone. It has been found beneficial, when using a combination of zinc acetate and antimony trioxide catalysts, to introduce a minor amount of a material such as tris(nonylphenyl)phosphite (TNPP) at the conclusion of the transesterification stage of the reaction in order to deactivate the zinc catalyst and prevent it from interfering with the antimony trixoide catalyst during the polycondensation stage.

The concentration of these catalyst materials can be varied from about 0.001 to about 1 per cent by weight based upon the total amount of dicarboxylic acid comonomer charged into the reactor. The preferred amount of catalysts is from about 0.01 to about 0.5 per cent by weight. Other materials can also be included in the reaction mixture such as color inhibitors, pigments, viscosity stabilizers, and the like.

Although the alkali metal hydroxide can, in some instances, exhibit a promoting effect on the transesterification or on the polycondensation, its role should not be confused with that of other well known transesterification or polycondensation catalysts. To obtain the full beneficial affects of the present invention, the alkali metal hydroxide is used in combination with transesterification and/or polycondensation catalysts.

One of the important features of the present invention process is the order of addition of the polyester-forming components into the reaction zone. It has been found that the ester-forming sulfonate dyeability modifiers of the present invention tend to interfere with the polyesterification reaction, particularly during the early stages such as when the transesterification reaction between the principal comonomers is taking place. Thus, it is important that the sulfonate compound not be introduced into the reaction zone until after the initial esterification and/or transesterification reaction is substantially complete.

For example, when dimethyl dicarboxylates are used as comonomers, the transesterification is essentially complete when the theoretical amount of methyl alcohol has been evolved from the reaction mixture. Thus, the sulfonate additive is not introduced into the reaction zone until after at least 80, preferably 100 per cent of the theoretical amount of methanol has been evolved. When free dicarboxylic acids are used as comonomers in the polyesterification, the completion of the initial esterification is signalled by the evolution of the theoretical amount of water from the reaction zone. Thus the sulfonate additive is not introduced into the reaction zone until after at least 80, preferably 100 per cent of the theoretical amount of water has been evolved.

Although the introduction of the sulfonate into the reaction zone should be delayed beyond the initial esterification and/or transesterification, it should not be delayed so long that it cannot be chemically incorporated into the polyester resin. Thus, the sulfonate modifier can be added at the completion of the initial transesterification or at any time during the subsequent polycondensation up until the resin achieves an inherent viscosity of about 0.3. Beyond this point it is possible that the sulfonate additive may be merely dispersed in the resin rather than chemically combined with it. The inherent viscosity is determined at 30° C on a solution of 0.5 g polymer per 100 ml of a 3:2 mixture of phenol and tetrachloroethane.

Though the presence of an alkali metal hydroxide component in the reaction zone is also very necessary, the point in the process at which it is introduced is somewhat less critical. It should be introduced into the reaction zone no later than the time at which the sulfonate is introduced, but it can, for convenience, be present throughout the entire polyesterification period by being included in the initial reactor charge together with the comonomers.

The products of the invention are dyeable linear polyester resins which can be converted to dyeable films or melt-spun to form filaments and fibers which are dyeable. Operations such as film-formation, spinning, dyeing, weaving, etc., are not an integral part of the present invention and can be carried out using technology which is presently well within the skill of the art. The dyeable polyesters of the present invention have a particular affinity for basic dyes.

In the examples which follow, a number of runs were carried out in which poly(ethylene terephthalate) resin was produced under varying conditions in a 2-liter stainless steel reactor designed for polycondensation reactions. The reactor contents were stirred at 10 rpm by an anchor-type stirrer and the reactor was equipped with a 0.5-in. O.D. stainless steel takeoff tube through which volatile reaction products could be removed. The reactor was also fitted with means to operate at reduced pressure and also had a means near the bottom of the reactor through which a slow stream of nitrogen could be bubbled through the polyester melt.

In these runs, 2.00 moles (388 g) of dimethyl terephthalate or mixtures with other monomers wherein the other monomers replace a portion of the dimethyl terephthalate, were charged into the reactor together with 5.00 moles (310 g) of ethylene glycol. The transesterification catalysts and polycondensation catalysts were also charged into the reactor at this time as was the sodium hydroxide (when present). The contents of the reactor were then heated under atmospheric pressure to a temperature of 150°–250° C (300°–480° F) over an interval of 1–2 hours. Usually the temperature was increased at a rate of 10° C every 10 minutes. The methanol distillation usually was complete before the reactor reached a temperature of 250° C.

When zinc acetate was used as the transesterification catalyst, trisnonylphenyl phosphite (TNPP) was then added to complex and deactivate the zinc so that it would not interfere with the polycondensation reaction. Except as noted, the sulfonate dyeability improver compound was also added at this same time, usually as a solution or slurry in some ethylene glycol. The system was then held under atmospheric pressure for about 15 minutes so that the sulfonate compound could react with the polyester. The temperature was then raised slowly to about 280° C (536° F) as the pressure was reduced slowly, to about 0.1 mm/Hg to remove the excess ethylene glycol. After about 30 minutes, nitrogen, at about 0.02 SCF/hr was bubbled through the polyester melt to still further aid in the removal of ethylene glycol. In all invention runs the sulfonate additive was introduced into the reaction zone after the methanol had been substantially removed but before the I.V. of the polyester reached 0.3.

At the completion of the polycondensation, after about 6 hours, the bottom of the reactor was opened and the polyester melt was extruded and immediately cooled. In some instances of high melting polyester resin, much of the polymer remained in the reactor and was removed mechanically therefrom.

The inherent viscosities of the polyesters were determined at 30°C (86°F) on a solution of 0.10 g of resin per 100 ml of a 3 to 2 mixture of phenol and tetrachloroethane. The diethylene glycol (DEG) content of the polyester was determined by hydrolysis of a sample followed by gas-liquid chromatographic determination of the amount of DEG and ethylene glycol. The melting points and glass transition points of the polyester were determined from a differential thermal analysis (DTA) thermogram. A sample was melted and quenched to a glass so that the glass transition point ($T_g$) could be determined. The melting points ($T_m$) were determined at the maximum rate of melting and not at the final disappearance of the last crystalline phase of highly oriented, crystalline fibers.

The basic dyeability of the polyesters was determined on thin films pressed between Teflon-coated aluminum foil on a hydraulic press at about 265°C (509°F). The films were cut into small pieces and 1.000 g was weighed into a 125 ml Erlenmeyer flask. Then 10 ml of each of the following three solutions was added to the flask: 0.25 g/liter of a leveling and wetting agent (Tanapal Me from Tanatex Chemical Corp.); 6,000 g/liter of a polyester swelling agent (Chemocarrier JL-F from Tanatex); and 1.000 g/liter of an oxazine type dye (Astrazon Blue BG-Color Index Basic Blue 3, Color Index 51005). Then 20 ml of deionized water was added and the solution was adjusted to a pH of 5.5 with 10 per cent solutions of trisodium phosphate and acetic acid.

The tops of the flasks were then covered with aluminum foil, and the flasks were placed in a boiling water bath for the specified time. The flasks were then cooled and the spent dye solution was decanted into a 100 ml volumetric flask. The dye films were rinsed with deionized water several times and then air-dried. The rinses were combined with the spent dye solution, diluted to 100 ml, and transferred to a square 4-ounce bottle. The amount of dye remaining was estimated visually by comparison with the standard dye solutions in the same size bottles.

In evaluating the poly(ethylene terephthalate) resins with regard to suitability for fiber-formation, the criteria used were as follows:

| | |
|---|---|
| Inherent Viscosity (I.V.) | 0.5 – 0.8 |
| Diethylene Glycol (DEG) content | 1 – 4 weight per cent |
| Glass Transition Temperature ($T_g$) | near 80°C |
| Melting point ($T_m$) | near 260°C |

Resins which displayed properties within or near these limits were considered suitable for fiber-forming.

EXAMPLE I

Several runs in which poly(ethylene terephthalate) was prepared were carried out as described above. In each of these runs a 0.03 weight per cent quantity of zinc acetate, based upon the total weight of the dimethyl terephthalate monomer, was present as the transesterification catalyst. Similarly, 0.045 weight per cent of antimony acetate was present as the polycondensation catalyst. After the evolution of methanol, 0.26 weight per cent of tris-nonylphenyl phosphite (TNPP) was added. The polycondensation reaction was carried out and completed at a finishing temperature of 288°C.

In several of these runs the 2.0 mol per cent quantity of dimethyl sodium 5-sulfoisophthalate (DMSI), based upon the total mols of diester monomer present, was added to the reactor. In one instance, the DMSI was added at the beginning of the reaction. In the other two instances, the DMSI was added still later. The results of this series of runs are shown in Table I below.

Table I

Preparation of Poly(ethylene Terephthalate) Modified with Dimethyl Sodium 5-Sulfoisophthalate (DMSI)

| Run | DMSI Mol % | DMSI Added at | Color[a] | I.V.[b] | DEG[c] Mol% | DTA,°C $T_g$ | DTA,°C $T_m$ |
|---|---|---|---|---|---|---|---|
| 1 | 0 | — | 0 | 0.63 | 2.07 | 79 | 258 |
| 2 | 2.0 | start | 2 | 0.36 | 17.3 | 61 | 225 |
| 3 | 2.0 | later[d] | 2 | 0.46 | 13.8 | 65 | 230 |
| 4 | 2.0 | later[e] | 1 | 0.53 | 4.37 | 77 | 259 |
| 5 | 0 | — | 0 | 0.99 | 1.21 | 80 | 257 |
| 7[f] | 2.0 | start | 2 | 0.25 | ND | 50 | 207 |
| 8[f] | 2.0 | later[d] | 1 | 0.31 | ND | 64 | 232 |

[a] Color of undyed polymer. Scale: 0 = colorless, 1 = very light tint; 2 = light tint.
[b] Inherent viscosity measured at 30°C in 3:2 phenol to tetrachloroethane using 0.5 g polymer/100 ml mixed solvent.
[c] Diethylene glycol content of polymer.
[d] Added after methanol evolution essentially completed and simultaneously with addition of TNPP.
[e] Added after reactor evacuated and nitrogen bleed begun.
[f] 0.03 wt. % antimony oxide used. Finishing temperature was 277°C.

Runs 1 and 5 which were carried out in the absence of the dyeability modifier are shown to produce resins which were essentially colorless and which has a desirably low diethylene glycol content and other properties which are suitable for the melt spinning of fibers. When the DMSI dyeability modifier was added to runs 2 and 7, on the other hand, there is seen a drastic decrease in desirable fiber-forming properties as indicated by the decrease in I.V., a great increase in DEG content, and substantial decreases in the glass transition temperature and melting point.

However, in runs 3, 4 and 8, it is seen that the fiber-forming properties of the polymer are significantly improved if the DMSI is added after the evolution of methanol. In run 4, the DMSI was added still later than in run 3 and the resulting polymer, although having improved fiber-forming properties, was seen to contain some white particles instead of being completely clear indicating that incorporation of the DMSI was somewhat incomplete and indicating that a somewhat earlier addition may have been optimum.

Thus, the series of runs described in Table I illustrates the problem which the present invention has been found to alleviate. Specifically the series shows the loss of fiber-forming properties typically experienced with the incorporation of DMSI. The series also illustrates one aspect of the present invention, namely the late addition aspect, which at least partially restores these lost fiber-forming properties.

EXAMPLE II

Another series of polyesterification runs was carried out in which minor amounts of the dyeability modifier, dimethyl sodium 5-sulfoisophthalate, were included in the reaction zone. Except as noted, the DMSI was added only after the transesterification was essentially complete, that is, after essentially all of the theoretical amount of methanol had been evolved from the reactor.

In several of the runs, minor amounts of sodium hydroxide were also added to the polymerization mixture at the beginning of the reaction. For purposes of comparison, several runs were also carried out which contained no DMSI dyeability modifier. The results from these runs are shown in Table II below.

TABLE II

Preparation of Poly(ethylene Terephthalate) Modified with Dimethyl Sodium 5-Sulfoisophthalate (DMSI) and NaOH

| Run | DMSI Mol% | NaOH[b] Eq.% | Color[c] | I.V.[d] | DEG[e] Mol% | DTA, °C $T_g$ | $T_m$ |
|---|---|---|---|---|---|---|---|
| 1 | 0 | 0 | 0 | 0.83 | 1.19 | 81 | 259 |
| 2 | 0 | (f) | 0 | 0.82 | 1.00 | 80 | 257 |
| 3 | 1.0 | 0 | 0 | 0.69 | 14.1 | 67 | 229 |
| 4 | 0.8 | 12.4 | 0 | 0.62 | 1.42 | 78 | 256 |
| 5 | 2.0 | 0 | 1 | 0.39 | 9.68 | 71 | 239 |
| 6 | 2.0 | 7.7 | 1 | 0.59 | 1.45 | 79 | 252 |
| 7 | 3.0 | 0 | 0 | 0.41 | 16.9 | 64 | 219 |
| 8 | 3.0 | 4.9 | 0 | 0.67 | 4.05 | 79 | 249 |
| 9 | 4.0 | 0 | 0 | 0.27 | 18.9 | 59 | 213 |
| 10 | 4.0 | 3.7 | 0 | 0.62 | 5.78 | 78 | 242 |
| 11[g] | 2.0 | 0 | 2 | 0.45 | 7.18 | 72 | 243 |
| 12[g] | 2.0 | 7.3 | 0 | 0.67 | 2.42 | 77 | 249 |

[a] Each run, except Runs 11 and 12, utilized 0.03 weight per cent zinc acetate and 0.03 weight per cent antimony oxide catalysts added at start of run. The DMSI, when used, was added together with the 0.26 weight percent TNPP after the methanol evolution was essentially complete.
[b] Equivalent per cent NaOH based on equivalents DMSI present.
[c,d,e] as described in Table I.
[f] Same amount present as in Run 6.
[g] These runs used 0.133 weight per cent calcium acetate and 0.03 weight per cent antimony oxide as catalyst system. No TNPP was used. The DMSI was present at start of reaction.

Run 1 in Table II is a typical example of a fiber-grade polymer which is prepared in this polyesterification system. Run 2 shows that incorporating minor amounts of sodium hydroxide into the system per se results in little change beneficial or otherwise. Run 3, however, in which 1 mole percent of DMSI is added, illustrates the penalty which is paid in fiber-forming properties when even this small amount of sulfonate compound is incorporated into the polymer. The inherent viscosity, the glass transition temperature, and the melting point of the polymer degenerate significantly. Most notably, however, the diethylene glycol content is increased dramatically and undesirably. Invention run 4, on the other hand, illustrates that the addition of a minor amount of sodium hydroxide substantially restores the desirable fiber-forming properties of the polymer and, in particular, reduces the diethylene glycol content to a desirable level.

A similar result is seen in runs 5 and 6. The incorporation of 2.0 mol per cent of DMSI is shown to have a deleterious effect on the fiber-forming properties of the polymer but the addition of a minor amount of sodium hydroxide significantly restores these properties to a desirable level. The beneficial effects of the invention are also seen in runs 7 through 10 at still higher levels of DMSI incorporation.

Runs 11 and 12 show the benefits of the process of the present invention with still another catalyst system, namely, calcium acetate and antimony oxide. Invention run 12 shows that the presence of a minor amount of sodium hydroxide significantly improves the fiber-forming properties of the polymer in which has been incorporated 2.0 mol per cent of DMSI. The DMSI has been present in the reaction zone from the start of the reaction and it is believed that the results would have been still more favorable had the addition of DMSI been delayed until after the transesterification stage.

EXAMPLE III

Still another series of polyesterification runs were carried out using a catalyst system comprising manganous acetate and antimony oxide. In one instance sodium methoxide was used in place of sodium hydroxide. The essential conditions and results of these runs are shown in Table III below.

TABLE III

Preparation of Copoly(Ethylene Terephthalate/Sodium 5-Sulfoisophthalate Using Manganous Acetate and Antimony Oxide Catalysts

| Run[a] | DMSI Mol% | Additive Used | Eq.%[b] | Color[c] | I.V.[d] | DEG[e] Mol% | DTA,°C $T_g$ | $T_m$ |
|---|---|---|---|---|---|---|---|---|
| 1 | 2.0 | NaOH | 7.1 | 0 | 0.26 | 2.49 | 70 | 252 |
| 2 | 2.0[f] | NaOH | 7.8 | 0 | 0.60 | 2.84 | 78 | 250 |
| 3 | 2.0 | NaOCH$_3$ | 15.2 | 0 | 0.22 | 1.76 | 68 | 254 |
| 4 | 2.0 | NaOH | 15.2 | 0 | 0.23 | 0.82 | 69 | 256 |

[a] Each run utilized 0.047 weight per cent manganous acetate and 0.03 weight per cent antimony oxide as catalysts. Catalysts, additives, and DMSI were present at start of reaction. Polycondensation was finished at 275°C under open pump vacuum for 3.0 hours.
[b,c,d,e] as described in Table I and II.
[f] In this run, the DMSI was added only after the methanol evolution had been essentially completed.

Comparison of run 1 with invention run 2 in Table III above is still another illustration, with still another catalyst system, of the beneficial effects obtained when the sulfonate dyeability modifier is not introduced into the reactor until after the transesterification is essentially complete. Invention run 2, which differs from control run 1 only in that the DMSI addition was delayed, shows significant improvements in the inherent viscosity of the resulting polymer as well as smaller improvements in the glass transition temperature. No improvement was observed in the diethylene glycol content of the polymer but this was already in satisfactory range because of the presence of sodium hydroxide in the control run.

Runs 3 and 4 illustrate the comparison between sodium hydroxide and sodium methoxide. Run 4, using sodium hydroxide, shows a slight improvement in all fiber-forming properties over those of run 3 which utilize sodium methoxide. It is believed that the results of run 4 would have been even more dramatic had the introduction of DMSI into the polymerization zone been delayed.

EXAMPLE IV

Still another series of runs was carried out which differed from the preceding runs in that the dyeability modifier was monosodium 5-sulfoisophthalic acid (SIA). Except as noted, this material was incorporated into the polymer using the general procedure and apparatus used in the preceding example. The essential conditions and results of these tests are shown in Table IV below.

Table IV

Preparation of Poly(Ethylene Terephthalate) Modified with Monosodium 5-sulfoisophthalic Acid

| Run | SIA[a] Added at | Finishing Temp.°C | Hrs. | Color[c] | I.V.[d] | DEG[e] Mol% | DTA,°C $T_g$ | $T_m$ |
|---|---|---|---|---|---|---|---|---|
|  | ol% |  |  |  |  |  |  |  |
| 1 | 0 | — | 288 | 3.5 | 0 | 0.67 | 3.04 | 78 | 256 |
| 2 | 2.0 | start | 288 | 3.5 | 1 | 0.30 | 18.6 | 61 | 222 |
| 3 | 2.0 | later[f] | 288 | 3.5 | 1 | 0.29 | 18.4 | 55 | 215 |
| 4 | 2.0 | later[g] | 288 | 3.5 | 1 | 0.35 | 8.75 | 71 | 243 |

Table IV-continued

Preparation of Poly(Ethylene Terephthalate) Modified with Monosodium 5-sulfoisophthalic Acid

| Run | SIA[a] Added at ol% | Finishing Temp.°C | Hrs. | Color[c] | I.V.[d] | DEG[e] Mol% | DTA,°C T_g | T_m |
|---|---|---|---|---|---|---|---|---|
| 5[h] | 2.0 later[f] | 277 | 5.5 | 1 | 0.57 | 12.6 | 67 | 230 |

[a]Monosodium 5-sulfoisophthalic acid; remainder is dimethyl terephthalate, with 0.03 weight per cent zinc acetate and 0.045 weight per cent antimony acetate as catalysts, and with 0.26 weight per cent TNPP added after methanol evolution.
[b]Held under open pump vacuum for 30 minutes then nitrogen was slowly bubbled through the melt for remainder of time.
c,d,e as described in Table I.
[f]Added after methanol evolution was essentially compared and simultaneously with addition of TNPP.
[g]Added after reactor evacuated and nitrogen bleed begun.
[h]Employed 7.3 equivalent per cent NaOH in this run only Comparing run 1 with the other runs of Table IV again points out the problems which occur in the fiber-forming properties of the polymer when such sulfonate dyeability additives are incorporated into the polymer. Specifically, the diethylene glycol content increases greatly and the inherent viscosity, the glass transition temperature and the melting point of the polymer are undesirably decreased.

Comparing run 2 with runs 3 and 4 illustrates that the delayed addition of this sulfonate dyeability modifier offers some improvement in fiber-forming properties, particularly if the SIA is sufficiently delayed.

Invention run 5 shows still more improvement over run 2 and illustrates that best results are obtained when the features of sodium hydroxide presence and delayed addition are both utilized in the polycondensation reaction. As can be seen from the data, however, the monosodium 5-sulfoisophthalate acid (SIA) does not respond as well to the features of the present invention and is, therefore, less preferred than the dimethyl sodium 5-sulfoisophthalate (DMSI).

EXAMPLE V

Another series of runs was carried out to illustrate the present invention using monosodium sulfosalicylic acid (SSA) as the dyeability-improving sulfonate. The polycondensation was carried out in essentially the same manner and in the same equipment as described in earlier examples. The essential conditions and the results of these runs are shown in Table V below.

TABLE V

Preparation of Poly(ethylene Terephthalate) Modified with Monosodium Sulfosalicyclic Acid (SSA)

| Run | SSA[a] Mol% | NaOH[b] Eq.% | Color[c] | I.V.[d] | DEG[e] Mol% | DTA, °C T_g | T_m |
|---|---|---|---|---|---|---|---|
| 1 | 0 | 0 | 0 | 0.83 | 1.19 | 81 | 259 |
| 2 | 1.0 | 15.0 | 1 | 0.53 | 7.04 | 71 | 243 |
| 3 | 1.0 | 30.0 | 0 | 0.72 | 3.18 | 76 | 253 |
| 4 | 2.0 | 6.2 | 4 | 0.50 | 16.9 | 67 | 231 |
| 5 | 2.0 | 30.1 | 2 | 0.47 | 6.38 | 70 | 245 |

[a]Monosodium sulfosalicyclic acid, remainder is dimethyl terephthalate with 0.03 weight per cent each of zinc acetate and antimony oxide and 0.26 weight per cent of TNPP (added after methanol evolution), and was finished at 277°C under open pump vacuum for 5 hours.
[b]of sulfonate
c,d,e as described in Tables I and II.

The data in Table V show that the incorporation of monosodium sulfosalicylic acid (SSA) into the polycondensation reaction zone also causes a deleterious effect on fiber-forming properties of the resulting polymer. However, the data also show that, if suitable amounts of sodium hydroxide are also introduced into the reaction zone, the deleterious effects of the sulfonate on the fiber-forming properties can be minimized.

EXAMPLE VI

Still another series of runs was carried out in which the advantages of the invention were demonstrated on the polycondensation of ethylene glycol and dimethyl terephthalate wherein both dimethyl sodium 5-sulfoisophthalate (DMSI) and sodium para-phenolsulfonate (PhS) are incorporated as dyeability modifiers. The polycondensation is carried out using procedures and apparatus as described previously. The essential conditions and the results of these runs are shown in Table VI below.

TABLE VI

Preparation of Poly(Ethylene Terephthalate) Modified with Mixtures of Dimethyl Sodium 5-Sulfoisophthalate and Sodium p-Phenolsulfonate

| Run | Sulfonate, Mol% DMSI[a] | PhS[b] | NaOH Eq % | Color[c] | I.V.[d] | DEG[e] Mol% | DTA T_g | °C T_m |
|---|---|---|---|---|---|---|---|---|
| 1 | 0 | 0 | 0 | 0 | 0.63 | 2.30 | 79 | 259 |
| 2 | 0 | 2.0 | 0 | 1 | 0.45 | 17.1 | 67 | 233 |
| 3 | 2.0 | 0 | 0 | 1 | 0.39 | 9.68 | 71 | 239 |
| 4 | 1.0 | 1.0 | 18.9 | 0 | 0.65 | 1.13 | 79 | 254 |
| 5 | 1.0 | 2.0 | 16.7 | 0 | 0.56 | 1.50 | 80 | 258 |
| 6 | 1.0 | 3.0 | 12.2 | 0 | 0.51 | 2.70 | 78 | 253 |
| 7 | 2.0 | 1.0 | 12.7 | 0 | 0.54 | 2.58 | 80 | 255 |
| 8 | 2.0 | 2.0 | 11.0 | 0 | 0.50 | 2.38 | 79 | 252 |
| 9 | 3.0 | 1.0 | 9.7 | 0 | 0.48 | 2.14 | 80 | 252 |

[a]Dimethyl sodium sulfoisophthalate.
[b]Sodium p-phenolsulfonate, remainder is dimethyl terephthalate, with 0.03 weight per cent zinc ace-

TABLE VI-continued

Preparation of Poly(Ethylene Terephthalate)
Modified with Mixtures of Dimethyl Sodium 5-Sulfoisophthalate
and Sodium p-Phenolsulfonate

| Run | Sulfonate,Mol% DMSI[a] | PhS[b] | NaOH Eq % | Color[c] | I.V.[d] | DEG[e] Mol% | DTA $T_g$ | °C $T_m$ |
|---|---|---|---|---|---|---|---|---| tate 0.03 weight per cent antimony oxide, and 0.26 weight per cent TNPP (added after methanol evolution essentially complete).
[c,d] and [e] as described in Table I.

Comparing the results of run 1 with the results of runs 2 and 3 again illustrates the deleterious effects of introducing sulfonate dyeability modifiers into the polyesterification reaction. The inherent viscosity, glass transition temperature, and melting point decrease undesirably and the diethylene glycol content of the polymer increases undesirably, in the absence of an additive such as sodium hydroxide.

Invention runs 4 through 9, on the other hand, have the benefit not only of delayed addition of the sulfonate modifiers but also have the benefit of the presence of minor amounts of sodium hydroxide. Hence, the products of runs 4 through 9, regardless of the ratios of the two different sulfonate modifiers, all produce polymers which have properties in the desired fiber-forming range.

EXAMPLE VII

A number of the poly(ethylene terephthalates) which were prepared in previous examples were dyed with a basic dye to illustrate the benefits obtained by incorporating the sulfonate dyeability modifiers into the polymer.

The essential conditions and results of these tests are shown in Table VII on the following page.

Runs 1 and 2 of Table VII illustrate the fact that, without the presence of a sulfonate dyeability modifier, polyester films accept only a negligible amount of dye. Runs 3 through 6, on the other hand, illustrate that the presence of a sulfonate such as dimethyl sodium sulfoisophthalate (DMSI), greatly enhances the dyeability of the polyester film and that the dyeability is essentially proportionate to the amount of sulfonate incorporated into the polymer from which the film was made. Runs 7 through 10 illustrate the satisfactory dyeability of films prepared from polymers into which were incorporated a mixture of dimethyl sodium sulfoisophthalate (DMSI) and para-phenolsulfonate (PhS). Run 11 illustrates the improved dyeability obtained when monosodium sulfosalicylic acid (SSA) was incorporated into the polymer from which the film was prepared.

Although the data in Table VII illustrate the improved dyeability obtained when suitable organic sulfonates are incorporated into polyesters, it does not illustrate the effects such organic sulfonates have on other important polymer properties. However, this is an important feature of the present invention and the beneficial effects of the invention with regard to these important physical properties have already been amply demonstrated in preceding examples.

TABLE VII

Dyeability of Sulfonate-Modified Poly(Ethylene Terephthalate)

| Run | Sulfonate,Mol% DMSI[a] | PhS[b] | SSA[c] | NaOH[d] Eq.% | In Dye Bath hrs. | Mils[e] | Film Blue Color[f] | BDA,-%[g] |
|---|---|---|---|---|---|---|---|---|
| 1 | 0 | 0 | 0 | 0 | 1.1 | 6 | 1 | 10 |
| 2 | 0 | 0 | 0 | (h) | 1.1 | 2–4 | 1 | 10 |
| 3 | 0.8 | 0 | 0 | 12.4 | 2.0 | 3–4 | 5 | 30 |
| 4 | 2 | 0 | 0 | 7.7 | 1.1 | 4–8 | 6 | 60 |
| 5 | 3 | 0 | 0 | 4.9 | 2.0 | 3–4 | 2–8 | 100 |
| 6 | 4 | 0 | 0 | 3.7 | 2.0 | 2–3 | 5–7 | 100 |
| 7 | 1 | 1 | 0 | 18.9 | 1.1 | 2–4 | 6 | 65 |
| 8 | 2 | 1 | 0 | 12.7 | 2.0 | 1–2 | 3–7 | 100 |
| 9 | 1 | 2 | 0 | 16.7 | 2.0 | 3–8 | 6–7 | 95 |
| 10 | 2 | 2 | 0 | 11.0 | 2.0 | 3–5 | 5–7 | 100 |
| 11 | 0 | 0 | 1 | 30.0 | 2.0 | 2–5 | 4 | 30 |

[a]Dimethyl sodium sulfoisophthalate.
[b]Sodium p-phenolsulfonate.
[c]Monosodium sulfosalicyclic acid.
[d]of sulfonate.
[e]Thickness range from thinnest to thickest pieces.
[f]Scale 0–9 ranging from colorless to very deep color.
[g]Estimated amount of basic dye absorbed by specimens from dye bath.
[h]Same amount NaOH present as in run 4.

EXAMPLE VIII

The polymers of runs 4, 7, 8 and 9 of Table VII were melt-spun to demonstrate the fact that they indeed were of fiber-forming quality. The polyesters were spun, the yarn plied, and these were then drawn to five times their length to give multifilament yarns (except the polyester of run 9 which was drawn only to 4 times its length). With the exception of the polymer of run 9, the fibers prepared from these polymers had fiber properties better than or nearly the same as those of the unmodified polyester.

The yarns were plied again to make about 160/24 yarns and these were knitted. The knits were dyed competitively with carrier with three different basic dyes and with two different disperse dyes. In addition, the knits were dyed competitively without carrier with one of the basic dyes. These dyes included three basic dyes: Sevron Blue ER K/S, Sevron Brilliant Blue BN K/S, Sevron Yellow R K/S, and two disperse dyes: Latyl Cerise Y K/S, and Setacyl Brilliant Blue LGB K/S. All of the fibers were found to be acceptably dyed with each of these dyes.

What is claimed is:

1. In a polyesterification process comprising contacting a dicarboxylic acid or its ester-forming derivative and a diol under polyester-forming conditions, the improvement comprising adding an effective dye receptivity improving amount of a sulfonate compound having the general formula

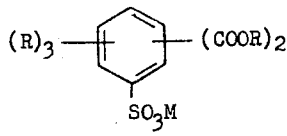

or

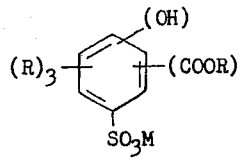

wherein each R is selected from hydrogen or alkyl radicals having from one to five carbon atoms and M is an alkali metal, said sulfonate being introduced into said polyesterification process after initial esterification or transesterification is essentially complete, as determined by evolution of 80 to 100 percent of theoretical amount of water or alcohol from the initial esterification or transesterification, there being present in addition an effective viscosity-modifying amount of an alkali metal hydroxide during at least a portion of said polyesterification reaction.

2. In a polyesterification process comprising contacting a dicarboxylic acid or its ester-forming derivative and a diol under polyester forming conditions, the improvement comprising incorporating into said polyesterification process a sulfonate represented by the general formula

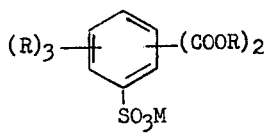

or

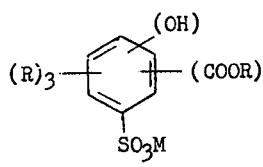

wherein each R is selected from hydrogen or alkyl radicals having from one to five carbon atoms and M is an alkali metal, said sulfonate being introduced into said polyesterification process in an amount within the range of 1 to 4 mole percent based on the total amount of moles of said dicarboxylic acid or its ester-forming derivative and said sulfonate after initial esterification or transesterification is essentially complete, as determined by evolution of 80 to 100 percent of a theoretical amount of water or alcohol from the initial esterification or transesterification, there being present in addition 1 to 50 equivalents of an alkali metal hydroxide per 100 mole equivalents of said sulfonate compound during at least a portion of said polyesterification reaction.

3. A process according to claim 2 wherein said sulfonate is a mixture of

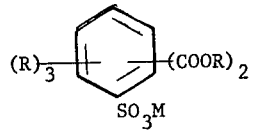

and

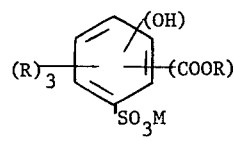

4. A method according to claim 2 wherein said sulfonate is a mixture of

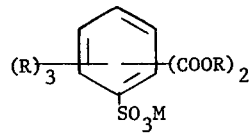

and at least one compound of the general formula

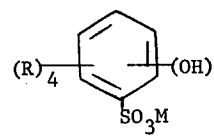

wherein R and M are as previously described.

5. A method according to claim 2 wherein said sulfonate is represented by the formula

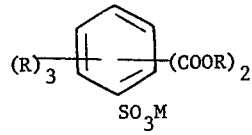

and wherein said alkali metal hydroxide is present in an amount within the range of 3 to 20 equivalent per cent based on said sulfonate compound.

6. A process according to claim 2 wherein said sulfonate is

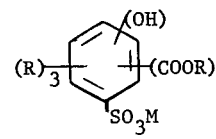

and wherein said alkali metal hydroxide is present in an amount within the range of 20 to 40 equivalent per cent based on said sulfonate compound.

7. A method according to claim 2 wherein said sulfonate is selected from the group consisting of dimethyl sodium 5-sulfoisophthalate, dimethyl potassium 5-sulfoisophthalate, di-n-pentyl lithium 3-sulfoterephthalate, potassium 5-sulfoisophthalic acid, monosodium 5-sulfosalicylic acid, monopotassium 5-sulfosalicylic acid, methyl lithium 5-sulfosalicylate, n-propyl sodium 3-hydroxy-4-sulfobenzoate, and monopotassium 2,5-dimethyl-4-hydroxy-3-sulfobenzoic acid.

8. A method according to claim 2 wherein said sulfonate is selected from dimethyl sodium 5-sulfoisophthalate and monosodium 5-sulfosalicylic acid.

9. A method according to claim 2 wherein said dicarboxylic acid or its ester-forming derivative is an ester of an aromatic dicarboxylic acid and said diol is a glycol containing two to 10 carbon atoms per molecule.

10. A method according to claim 9 wherein said ester is dimethyl terephthalate and said glycol is ethylene glycol.

11. A method according to claim 10 wherein said alkali metal hydroxide is sodium hydroxide.

12. A method according to claim 11 wherein said dimethyl terephthalate and said ethylene glycol are heated at a temperature of 150° C. to 270° C. to effect an initial transesterification reaction with removal of the methyl alcohol thus evolved; and thereafter the reaction mixture is further heated to complete the polycondensation and to distill excess glycol from the reaction mixture, the initial molar ratio of glycol to terephthalate being in the range of 2:1 to 4:1, there being present during said polyesterification a catalyst selected from the group consisting of antimony oxide, zinc acetate, manganese acetate, and cobaltous acetate.

* * * * *